(12) United States Patent
Sridhar

(10) Patent No.: US 7,126,910 B1
(45) Date of Patent: Oct. 24, 2006

(54) LOAD BALANCING TECHNIQUE FOR A RESILIENT PACKET RING

(75) Inventor: Kamakshi Sridhar, Plano, TX (US)

(73) Assignee: Alcatel, Paris (FR)

( * ) Notice: Subject to any disclaimer, the term of this patent is extended or adjusted under 35 U.S.C. 154(b) by 1006 days.

(21) Appl. No.: 10/020,593

(22) Filed: Dec. 13, 2001

(51) Int. Cl.
H04L 12/56 (2006.01)

(52) U.S. Cl. ..................................... 370/229; 370/258

(58) Field of Classification Search ................ 370/222, 370/223, 229, 230, 258
See application file for complete search history.

(56) References Cited

U.S. PATENT DOCUMENTS

| | | | |
|---|---|---|---|
| 5,541,913 A | 7/1996 | Witters et al. | |
| 5,703,870 A | 12/1997 | Murase et al. | |
| 5,864,540 A | 1/1999 | Bonomi et al. | |
| 5,974,033 A | 10/1999 | Kamiya et al. | |
| 6,064,651 A | 5/2000 | Rogers et al. | |
| 6,198,743 B1 | 3/2001 | Giroux et al. | |
| 6,260,072 B1 | 7/2001 | Rodriguez-Moral | |
| 2002/0018481 A1* | 2/2002 | Mor et al. ................... | 370/403 |
| 2002/0118700 A1* | 8/2002 | Bruckman ................... | 370/460 |
| 2002/0186667 A1* | 12/2002 | Mor et al. ................... | 370/258 |
| 2003/0048754 A1* | 3/2003 | Bruckman ................... | 370/252 |
| 2003/0103449 A1* | 6/2003 | Barsheshet et al. ......... | 370/222 |

OTHER PUBLICATIONS

Medard et al. "Architecture Issues for Robust Optical Access". IEEE. Jul. 2001, pp. 116-122.*
Stallings, William. "Data and Computer Communications". Prentice Hall. 1997. pp. 248-252.*
U.S. Appl. No. 60/333,936, filed Nov. 28, 2001, Barcheshet et al.*
Bruno, Estimation of Token Bucket Parameters of VoIP Traffic, Proceedings of the Conference on High Performance Switching and Routing, 2000, pp. 353-356.
Chiruvolu, et al., An Efficient Edge-based Congestion Management for a Differentiated Services Domain, Proceedings of the Ninth International Conference on Computer Communication and Networks, 2000, pp. 75-80.
Kidambi, Dynamic Token Bucket (DTB): A Fair Bandwidth Allocation Algorthim High-Speed Networks, Proceedings of the Eighth International Conference on Computer Communications and Networks, 1999, pp. 24-29.
Gevros, et al., Congestion Control Mechanisms and the Best Effort Service Model, IEEE Network, May-Jun. 2001, pp. 16-26, vol. 15, Issue 3.
Striegel, et al., Dynamic Class-Based Queue Management for Scalable Media Server, Proceedings of the Sixth IEEE Conference on Real-Time Technology and Applications Symposium, 2000, pp. 228-236.

(Continued)

*Primary Examiner*—Derrick Ferris
(74) *Attorney, Agent, or Firm*—Danamraj & Youst, PC; Jessica W. Smith; V. Lawrence Sewell

(57) ABSTRACT

A technique for load balancing in resilient packet ring ("RPR") networks, including wavelength division multiplex RPR ("WDMRPR") networks is described. In one embodiment, the present technique comprises implementing on every node a QoS/BB monitor, which is common to all rings in the RPR and has knowledge of traffic performance for each class on each ring of the RPR, which information is obtained through periodic measurements or in response to failure events. This allows the monitor to vary the QoS parameters on a node, for a particular traffic class, to achieve load balancing. Likewise, the QoS/BB monitor can signal to the BB entity at higher layers to vary the BB parameters on a node for a particular class to achieve load balancing. The QoS/BB monitor enables QoS and BB parameter changes to be coordinated with one another.

18 Claims, 4 Drawing Sheets

OTHER PUBLICATIONS

Mahadevan, et al., Quality of Service in Wireless Networks Based on Differentiated Services Architecture, Proceedings of the Eighth International Conference on Conputer Communications and Networks, 1999, pp. 548-553.

Herrera, et al., A Framework for IP Over Resilient Packet Rings, Internet Draft, IETF Working Group IP Over Resilient Packet Rings, Jun. 2001.

Tsiang, et al., The Cisco SRP MAC Layer Protocol, RFC 2892 IEFT, Network Working Group, Aug. 2000.

* cited by examiner

LOAD BALANCING TECHNIQUE FOR A RESILIENT PACKET RING

CROSS-REFERENCE TO RELATED APPLICATION(S)

This application discloses subject matter related to the subject matter disclosed in commonly owned, co-pending U.S. patent application Ser. No. 10/020,619, entitled "SIGNALING FOR CONGESTION CONTROL, LOAD BALANCING, AND FAIRNESS IN A RESILIENT PACKET RING", filed Dec. 13, 2001 in the name(s) of: Kamakshi Sridhar.

BACKGROUND OF THE INVENTION

1. Technical Field of the Invention

The present invention generally relates to resilient packet rings ("RPRs") and wavelength division multiplex RPRs ("WDMRPRs"). More particularly, and not by way of any limitation, the present invention is directed to a load balancing technique for use in RPRs and WDMRPRs.

2. Description of Related Art

Resilient Packet Ring ("RPR") is a packet-based technology designed primarily for implementing metropolitan area networks ("MANs"). The basic topology of RPR is a dual counter-rotating ring in which both rings transport both data and control packets. WDMRPR is an RPR with more than one wavelength per ring. RPR technology includes a Medium Access Control ("MAC") mechanism that controls access to the RPR.

FIG. 1 is an example RPR network 100 consisting of five nodes, respectively designated A–E, and two rings, illustrated in FIG. 1 as an outer ring X and an inner ring Y. Each node A–E is connected to its adjacent nodes via at least two links; one on the inner ring and one on the outer ring. Links on the inner ring are designated a–e, while links on the outer ring are designated $\alpha$–$\epsilon$. Accordingly, nodes A and B are connected by links $\alpha$ and e, nodes B and C are connected by links $\beta$ and d, nodes C and D are connected by links $\gamma$ and c, nodes D and E are connected by links $\delta$ and b, and nodes E and A are connected by links $\epsilon$ and a.

Information is carried in one and only one direction on a ring, either clockwise or counter-clockwise. As illustrated in FIG. 1, the outer ring X carries data and control packets in the clockwise direction and the inner ring Y carries data and control packets in the counter-clockwise direction. Features of RPR include spatial reuse and destination stripping, fast protection, media independent MAC, support for layer 2 devices (e.g., Ethernet switches) and layer 3 devices (e.g., routers). RPR operates as a distributed switch at layer 2. Alternatives to RPR include SONET/SDH rings and Ethernet switches. The former, implemented with routers, is expensive and inefficient for dynamic traffic patterns; however, it provides efficient protection. The latter offers no protection bandwidth or fairness, but does provide efficient bandwidth utilization. Moreover, in contrast to layer 3 devices, RPR has ring awareness. RPR, therefore, is intended to embody the best features of both SONET and Ethernet switches, that is, bandwidth efficiency, fairness, and fast protection. To realize these features, the RPR should provide a basic ring access mechanism, additional mechanisms to provide satisfactory performance for traffic transiting the ring, and appropriate protection features.

Several RPR terms and concepts will now be defined. Referring again to FIG. 1, assume that traffic destined for node D enters the ring at node A and passes through nodes B and C. Node A is referred to as the "ingress node", node D is referred to as the "egress node", and nodes B and C are referred to as "intermediate nodes." As previously noted, the fiber connecting two nodes is referred to as a "link". In WDMRPR, a wavelength between two nodes is referred to as a link. From the perspective of nodes B and C, traffic from node A is "ring traffic". Traffic entering node B or C is referred to as "tributary traffic," with respect to node A traffic.

At the ingress node, as soon as a flow is admitted to the RPR, an RPR header is created and attached to every packet within the flow. The RPR header contains a Class of Service ("CoS") marking, a preemption bit, a ring identifier, and a destination MAC address. Each intermediate node will examine the incoming packet and perform an address lookup. If the packet is destined for the current node, it is taken off the ring at that node. If it is destined for some other node, it is placed back on to the ring.

One problem inherent in RPR architecture is the problem of load imbalance between two or more rings or wavelengths. Hereinafter, unless otherwise explicitly specified, the term "rings" will be deemed to encompass both rings and wavelengths. Load imbalance results from excessive traffic on one ring, as compared to little traffic on another ring. In an RPR with two rings, there are only two options for sending traffic from one node to another node, either on one ring or on the other. In such cases, traffic is typically sent on the ring with the fewest hops. This may result in a situation where a lot of traffic travels from one node to another on only one ring, because the ring has fewer hops as compared to the other ring.

Additionally, because RPR employs destination stripping, certain segments on one ring are typically more heavily loaded as compared to other segments on the same ring. Also, certain segments on one ring may be much more heavily loaded as compared to segments on the other ring.

As previously indicated, load imbalance may be defined as the concurrent overutilization of capacity on one or more links in the RPR and the underutilization of capacity of other links in the RPR. Load imbalance can be illustrated as follows. Referring again to FIG. 1, traffic going from node A to node B can travel either on the outer ring, via link $\alpha$, or on the inner ring via links a, b, c, and d. For obvious reasons, traffic will tend to take the link $\alpha$, since it is the more direct route. In the absence of any other traffic on the RPR, the link $\alpha$ will be overutilized, while the other links will be underutilized. The solution is to "load balance" the traffic between the links so that packets of a given class will experience approximately the same delay regardless of what the shortest path is.

Thus, traffic going from one node to another experiences varying amounts of delay depending on how many and which heavily loaded segments it traverses. Since traffic performance is judged by total end-to-end delay, the traffic performance (delay, dropped packets, etc.) on one ring may be significantly worse than the traffic performance on the other ring for a single class of service. This results in congestion on one ring versus unused capacity on the other ring and therefore requires load balancing.

Load balancing in RPR involves two functions: (a) diverting incoming flows from more heavily loaded rings to alternate paths on other rings, where they will likely experience more hops, but better performance, due to less traffic; and (b) improving the performance of existing traffic on the heavily loaded ring. Perfect load balancing in RPR, for all classes, between all pairs of nodes, is challenging due to the ring structure and destination stripping features of RPR.

Load balancing performed for one pair of nodes for one class may result in traffic redistribution that might necessitate load balancing between another pair of nodes for the same or different traffic class. Dynamic traffic patterns and time-dependent flow arrivals and departures also complicate load balancing in RPR.

Prior art for load balancing traffic in multiple rings (or wavelengths) of RPR is currently not known to exist. Prior art for changing quality of service ("QoS") parameters of various classes relative to one another is inadequate to help divert traffic to alternate paths on multiple rings. Prior art to change the token bucket ("TB") parameters, including peak data rate and maximum burst size, for aggregate traffic flows does not allow the behavior of traffic classes to be changed relative to one another. While it may be adequate to reduce congestion in a network, it is inadequate to implement load balancing between rings in an RPR. Finally, all known prior art is restricted to only TB parameters and does not consider the interaction between the bandwidth broker ("BB") parameters, which include allocated bandwidth, available bandwidth, and used bandwidth, and the QoS parameters, which include the TB parameters as well as the class based queuing ("CBQ") parameters.

SUMMARY OF THE INVENTION

Accordingly, the present invention advantageously provides a technique for load balancing in an RPR. In one embodiment, the present invention comprises implementing on every node a QoS/BB monitor to achieve load balancing in an RPR. The principles of the present invention are applicable to dual-ring and multi-ring RPR, as well as wavelength division multiplexing ("WDM") and dense wavelength division multiplexing ("DWDM") RPR. The term "RPR" will be deemed to include all of the foregoing types of RPR, as well as other types of RPR to which the principles of this invention may apply. The QoS/BB monitor on a node is common to all rings in the RPR. It has knowledge of traffic performance for each class on each ring of the RPR, which knowledge is obtained through periodic measurements or in response to failure events. This allows the monitor to vary the QoS parameters on a node, for one or more rings, for a particular traffic class, to achieve load balancing. Likewise, the QoS/BB monitor can signal to the BB entity at higher layers to vary the BB parameters on a node, for one or more rings, for a particular class, to achieve load balancing.

Changing BB parameters affects call admission of new traffic flows. Changing QoS parameters affects performance of traffic already on the ring. BB parameter variations result in coarse variation of traffic performance, while QoS parameter variations are likely to result in finer variation of traffic performance. Through the combination of varying QoS parameters and BB parameters, the QoS/BB monitor can throttle traffic on one ring and permit more traffic on another ring, for a particular traffic class, to achieve load balancing. By signaling to the BB entity to change its parameters, the ability to divert traffic at the node ingress from one ring to another ring may be achieved.

The key benefit of having one entity that controls both the QoS parameters and the BB parameters is that the traffic behavior can be modified appropriately, in terms of direction and servicing rate, to ultimately achieve load balancing.

In one aspect, the invention comprises a method of implementing load balancing in an RPR network comprising a plurality of nodes and first and second rings each comprising a plurality of links for carrying information between the nodes in a clockwise direction and a counterclockwise direction, respectively, wherein adjacent ones of the nodes are connected by two of the links. The method comprises the steps of: for one of the nodes, a determining whether a load imbalance exists at the node in connection with a first class of service; and responsive to a determination that a load imbalance exists, changing Bandwidth Broker ("BB") parameters at the node for the first class of service to cause new flows to be diverted from a more heavily loaded one of the rings to a less heavily loaded one of the rings and changing Quality of Service ("QoS") parameters at the node for the first class of service to improve traffic performance on the more heavily loaded one of the rings, while increasing bandwidth utilization on the less heavily loaded one of the rings.

In another aspect, the present invention comprises an apparatus for implementing load balancing in an RPR network comprising a plurality of nodes and first and second rings each comprising a plurality of links for carrying information between the nodes in a clockwise direction and a counterclockwise direction, respectively, wherein adjacent ones of the nodes are connected by two of the links. The apparatus comprises, at one of the nodes, a detector means and/or its equivalents for detecting at the node a load imbalance in connection with a first class of service; a structure responsive to detection at the node of a load imbalance for changing BB parameters at the node for the first class of service to cause new flows to be diverted from a more heavily loaded one of the rings to a less heavily loaded one of the rings; and a structure responsive to detection at the node of a load imbalance for changing QoS parameters at the node for the first class of service to improve traffic performance on the more heavily loaded one of the rings, while increasing bandwidth utilization on the less heavily loaded one of the rings.

In a further aspect, the invention comprises an apparatus for implementing load balancing in an RPR network comprising a plurality of nodes and first and second rings each comprising a plurality of links for carrying information between the nodes in a clockwise direction and a counter-clockwise direction, respectively, wherein adjacent ones of the nodes are connected by two of the links. The apparatus comprises, at one of the nodes, a QoS/BB monitor responsive to detection at the node of a load imbalance in connection with a first class of service for signaling to a BB to change BB parameters at the node for the first class of service to cause new flows to be diverted from a more heavily loaded one of the rings to a less heavily loaded one of the rings and for changing QoS parameters at the node for the first class of service to improve traffic performance on the more heavily loaded one of the rings, while increasing bandwidth utilization on the less heavily loaded one of the rings.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
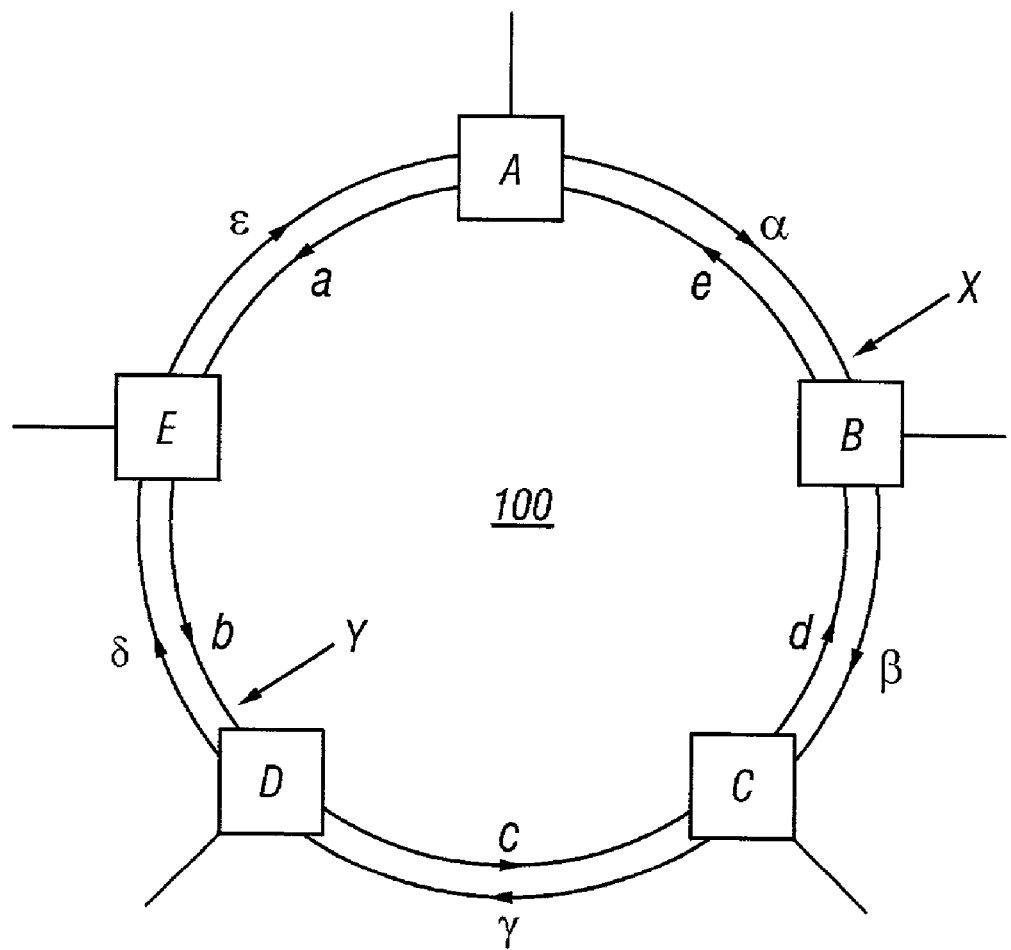
FIG. 1 depicts an exemplary RPR network arrangement in which teachings of the present invention may be advantageously practiced.

In the drawings, like or similar elements are designated with identical reference numerals throughout the several views thereof, and the various elements depicted are not necessarily drawn to scale. Referring again to FIG. 1, depicted therein is an exemplary RPR network 100 in which the teachings of the present invention may be advantageously practiced. It should be recognized that, although the RPR network 100 comprises five nodes A–E, in general, there can be more or fewer nodes on the network 100. Moreover, although each of the nodes A–E are illustrated as being connected to its adjacent nodes by only two links, it should be recognized that the principles of the invention described herein can be applied to an RPR comprising more than two rings, and therefore more than two links between adjacent nodes. The teachings of the present invention are also applicable to WDM and DWDM RPR networks.

Consider a large volume of traffic going from node A to node C. Two choices exist: (a) the path including links α and β (path α-β) via the outer (clockwise) ring; and (b) the path including links a, b, and c (path a-b-c) via the inner (counter-clockwise) ring. Typical path selection protocols will result in the selection of the first path (path α-β), as it has the fewest number of hops. New traffic entering node A destined for node C must be diverted to path a-b-c for better performance. This is achieved through the load balancing method of the present invention as described herein. Additionally, performance of existing traffic on the path α-β will be improved as part of the load balancing method of the present invention.

Consider now new traffic entering node B destined for node C. The natural path is via link β, which provides a direct path between nodes B and C; however, this link is heavily loaded with traffic from node A destined for node C. Therefore, it may be better to send new incoming traffic via the path comprising links e, a, b, c (path e-a-b-c).

To account for traffic variations, load balancing is performed at periodic time intervals on a per class basis. For discussion, it will be assumed that traffic flows are classified into three classes of service, including Class 1 (highest priority), Class 2 (medium priority), and Class 3 (lowest priority); however, it will be recognized that the teaching of the present invention may be applied to any number of classes of service. Additionally, although for the sake of simplicity, the load balancing technique of the present invention will be illustrated as applied to Class 1, it will be recognized that it may be applied to any class of service.

Figure 2:
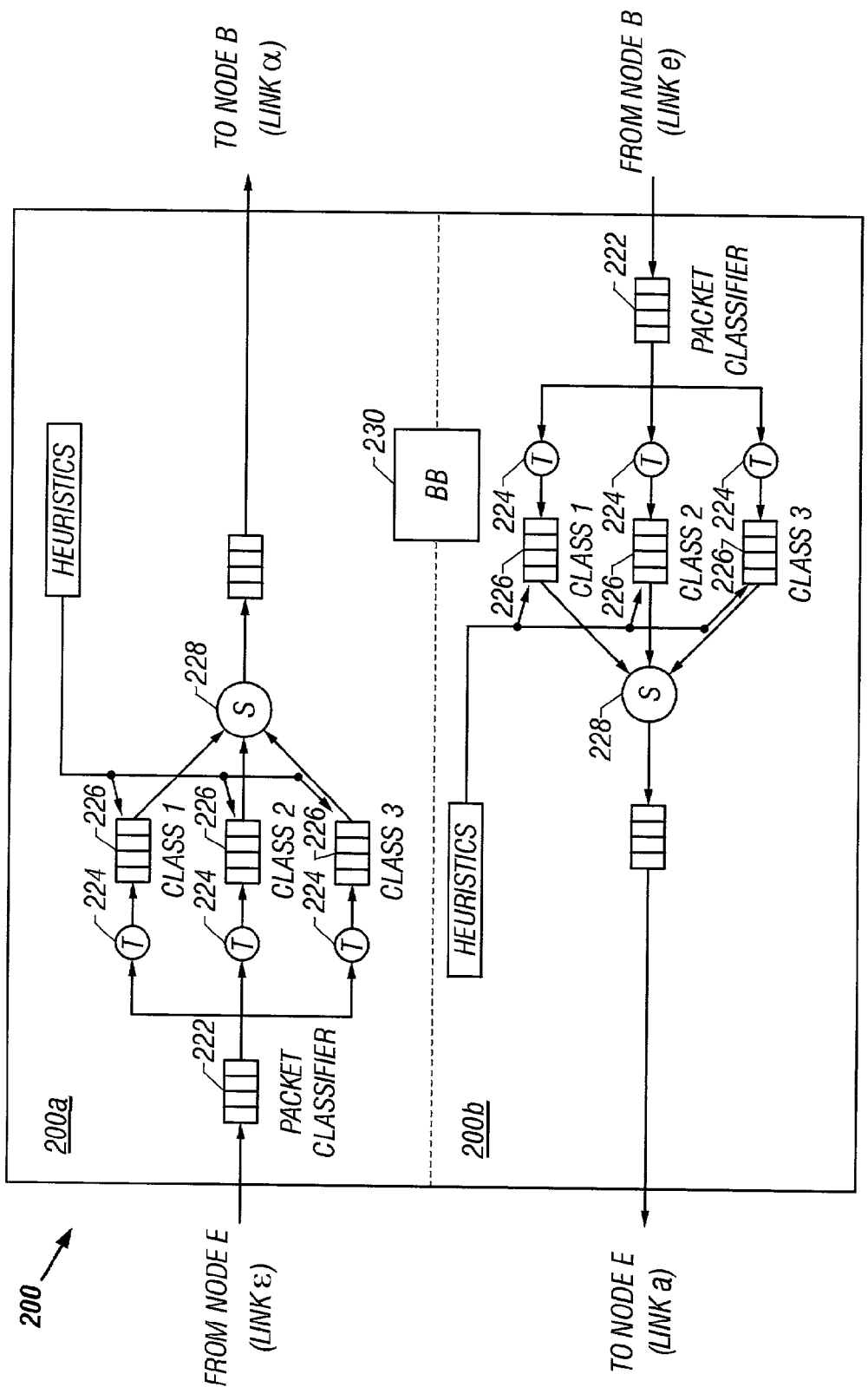
FIG. 2 (Prior Art) depicts a block diagram of an exemplary embodiment of a single node of an RPR network according to teachings of the prior art.

FIG. 2 is a block diagram of an existing QoS implementation within a single node 200. It will be assumed for the sake of example that the node 200 represents node A of the RPR 100 (FIG. 1). In general, as illustrated in FIG. 2, packets entering the node 200 are classified by a packet classifier 222 into one of the three classes. Packets of each class are shaped by a respective token bucket policer 224 depending on various token bucket ("TB") parameters (e.g., peak data rate and maximum burst size). Packets may be dropped if the traffic rate is excessive. Once shaped, packets are put into respective class based queues ("CBQs") 226 and drained from the CBQs 226 depending on the CBQ parameter specification of how many packets of each class can be serviced by a scheduler 228 at each service rotation. The CBQ and TB parameters together comprise the quality of service ("QoS") parameters.

A bandwidth broker ("BB") 230 located at a higher layer (e.g., layer 3) is responsible for bandwidth allocation to each class for a particular link. The BB parameters per class include allocated bandwidth, used bandwidth, and available bandwidth. The allocated bandwidth for a class refers to the total bandwidth available for that class on a link. Of this, only a portion of the bandwidth is used by the various flows. The difference between allocated bandwidth and used bandwidth is the available bandwidth for that class on that link. The sum of the allocated bandwidths for all classes equals the useful link capacity.

In a top portion 200a of the node 200, the QoS parameters are applied to traffic going to link a between nodes A and B and in a bottom portion 200b of the node 200, the QoS parameters are applied to traffic going to link a between nodes A and E. Likewise for the BB parameters, even though the BB 230 is shown as a single entity for simplicity.

Figure 3:
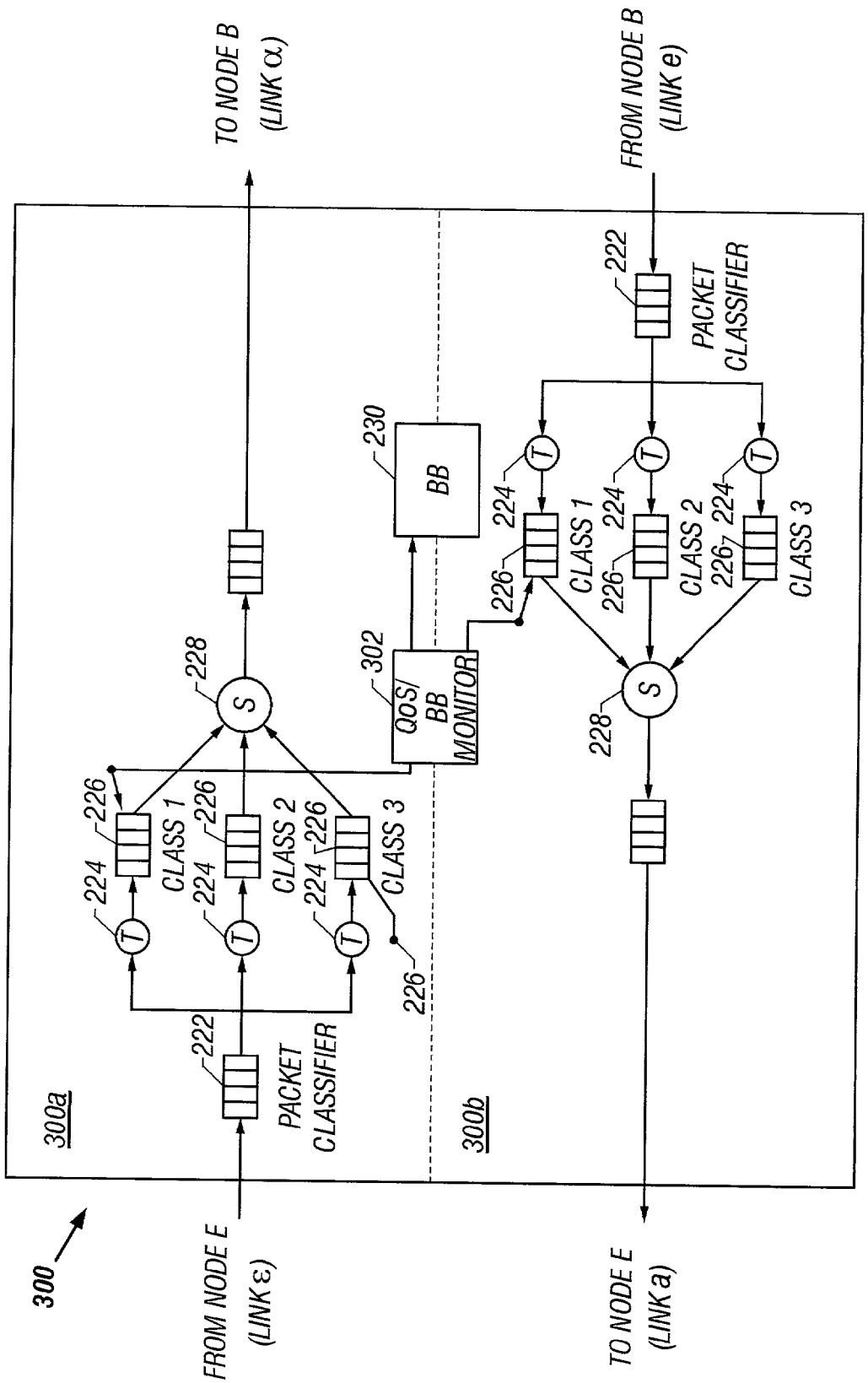
FIG. 3 depicts a block diagram of an exemplary and presently preferred embodiment of a single node of an RPR network in which teachings of the present invention may be advantageously practiced.

FIG. 3 is a block diagram of a node 300 embodying features of the present invention for implementing a load balancing technique. The node 300 is identical in all respects to the node 200 (FIG. 2), except that it includes a QoS/BB monitor 302. For purposes of clarity, only interaction of the monitor 302 with Class 1 is illustrated in FIG. 3; however, it should be recognized that, in practice, the monitor 302 is common to all rings in the RPR and monitors the traffic performance for each class on each ring at the node 300. With this knowledge, it can change the QoS parameters of each class on each link one at a time, for a particular traffic class. Likewise for the BB parameters.

Traffic performance (e.g., delay, jitter, dropped packets) is sensed by the QoS/BB monitor 302 at periodic time intervals by an in- or out-of-band signaling mechanism, such as that described in commonly-assigned U.S. patent application Ser. No. 10/020,619, filed Dec. 13, 2001, entitled SIGNALING FOR CONGESTION CONTROL, LOAD BALANCING, AND FAIRNESS IN A RESILIENT PACKET RING, which is hereby incorporated by reference in its entirety. Changes to the QoS and BB parameters are made after load imbalance is detected, as will be described in greater detail below.

The load balancing technique will now be described with reference to FIGS. 1, 3 and 4. Load balancing is initiated either after a failure event or at periodic time intervals $T_k$. The following variables, as defined below, will be used to illustrate the load balancing technique of the present invention. In connection with a variable, subscript 1 denotes Class 1, subscript 2 denotes Class 2, and subscript 3 denotes Class 3. The load balancing technique is described here with reference to node A. The same technique is applicable to every other node. Notation is defined below only for Class 1.

$B_{1\alpha}$, $B_{1a}$ # bytes in CBQ drained off each rotation for traffic going to link α and link a, respectively $T_{p1\alpha}$, $T_{p1a}$ TB peak rate allowable for traffic going to link α and link a, respectively $T_{b1\alpha}$, $T_{b1a}$ maximum TB burst size allowable for traffic going to link α and link a, respectively $T_k$ time interval at which traffic measurements are made to detect load imbalance $T_{all\alpha}$, $T_{alla}$ allocated bandwidth for links α and a, respectively $T_{av1\alpha}$, $T_{av1a}$ available bandwidth for links α and a, respectively $Tu1\alpha$, $T_{u1a}$ used bandwidth for links α and a, respectively $d_{1\alpha}$, $d_{1a}$ delays of the marked packets on links α and a, respectively, for Class 1 obtained at specific time intervals $T_k$ or when there is a failure event $dr_{1\alpha}$, $dr_{1a}$ # of dropped packets on link α and link a, respectively, for Class 1 during the time interval $T_k$ $j_{1\alpha}$, $j_{1a}$ jitter of packets on link α and link a, respectively, for Class 1 (to determine these variables, two successive packets for the class need to be marked)

CBQ parameters for link α are $B_{1\alpha}$, $T_{p1\alpha}$, and $T_{b1\alpha}$, and CBQ parameters for link a are $B_{1a}$, $T_{p1a}$ and $T_{b1a}$. BB parameters for link α are $T_{a11\alpha}$, $T_{av1\alpha}$, and $T_{u1\alpha}$. BB parameters for link a are $T_{a11a}$, $T_{av1a}$, and $T_{u1a}$. It should be noted that available bandwidth and used bandwidth are obtained from the BB entity 230 at higher layers made available through an RPR control channel. Example of constraints to which traffic in class 1 must conform are defined as follows:

$$dr_{1(\alpha\ or\ a)} <= DR_1$$
$$d_{1(\alpha\ or\ a)} + j_{1(\alpha\ or\ a)} <= D_{max1}$$

where $DR_1$ is the maximum acceptable number of dropped packets for Class 1 and $D_{max1}$ is the maximum acceptable delay for Class 1. Similar constraints are defined for other classes.

Figure 4:
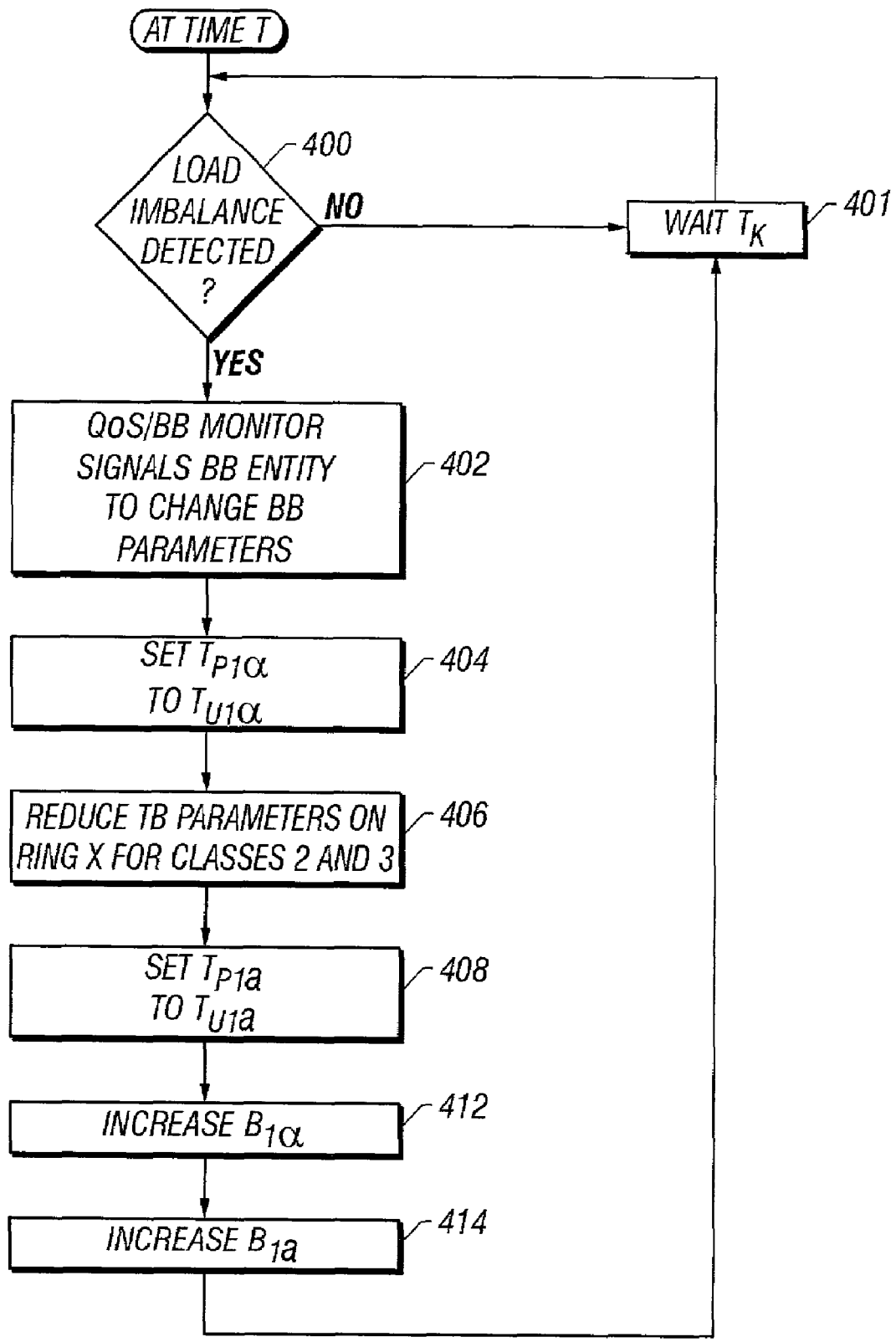
FIG. 4 depicts a flowchart of a load balancing technique for implementation in an RPR network in accordance with the teachings of the present invention.

FIG. 4 is a flowchart of the operation of a load balancing method for RPR in accordance with teachings of the present invention. Execution begins in step 400 at a time T. In step 400, load imbalance detection is performed and a determination is made whether a load imbalance has been detected. Load imbalance detection at each node is skewed with respect to other nodes at time intervals of m, where m<$T_k$. Detecting load imbalance may be accomplished in any number of ways, including, for example, measurements of delays and/or dropped packets. One method of detecting load imbalance is to measure and compare delays for test packets sent from node A to a node midway, for example, node C, on each of the two rings. Otherwise, some other node destination may be picked to test for load imbalance. If the delay and/or number of dropped packets is significantly higher on one ring, e.g., ring X, than the other ring, e.g., ring Y, for a given pair of nodes, then it could trigger the load balancing operation, as described below. Alternatively the constraints for each of the rings X and Y could be evaluated to determine a trigger for the load balancing operation. The threshold for triggering the load balancing operation should be sufficiently low so that the QoS/BB monitor can be sensitive to dynamic traffic patterns, but sufficiently high to prevent too frequent load balancing from occurring.

If load imbalance is not detected in step 400, step 400 is repeated again at the next time interval $T_k$ (step 401). If load imbalance is detected in step 400 between rings X and Y, then load imbalance correction must be performed at node A as described in steps 402–412. Since link α is overutilized and link a is underutilized, the BB parameters must be changed so that traffic is diverted at node A from link α to link a (i.e., from ring X to ring Y). In step 402, responsive to a decision to implement load balancing, the QoS/BB monitor 302 at node A signals the BB entity 230 to change the BB parameters so that more bandwidth is available for new incoming Class 1 flows on ring Y and less bandwidth is available for new incoming traffic for Class 1 on ring X. Note that except for the interaction with the QoS/BB monitor 302, the two rings operate independently of one another.

The QoS/BB monitor 302 signals the BB monitor 230 to decrease $T_{a11\alpha}$ and increase $T_{a11a}$. This will effectively cause a Call Admission Control (CAC) entity (not shown), either co-located with or separate from the BB entity 230 at node A, to admit more traffic flows on ring Y rather than on ring X, due to the increase in available bandwidth for Class 1 traffic on link a and the concurrent decrease in available bandwidth for Class 1 traffic on link α.

Next, the QoS parameters for Class 1 on ring X and for Class 1 on ring Y must be changed so as to improve traffic performance on ring X while increasing bandwidth utilization on ring Y. From the perspective of node A, the QoS parameters for Class 1 must be changed so as to improve traffic performance on link α while increasing bandwidth utilization on link a. To let more traffic on link a at node A, the TB peak rate $T_{p1a}$ must be increased. To restrict the traffic on link α at node A, the TB peak rate $T_{p1\alpha}$ must be decreased. The foregoing is accomplished as described below with respect to steps 404–414. In step 404, $T_{p1\alpha}$ is set to $T_{u1\alpha}$. There is an interaction between the BB parameters and the QoS parameters. By signaling changes to the BB entity 230 to decrease $T_{a11\alpha}$ (step 402), fewer flows will be admitted on link α on ring X; thus, $T_{u1\alpha}$ will decrease over a period of time, or not increase very much. Since $T_{p1\alpha}$ is set to $T_{u1\alpha}$ a decrease in $T_{u1\alpha}$ will result in a decrease in $T_{p1\alpha}$. Thus existing traffic for Class 1 will enter link a at node A at a lower peak rate and hence improve the performance of existing traffic on link α for Class 1. In step 406, the TB parameters for Classes 2 and 3 on link α on ring X ($T_{p2\alpha}$, $T_{b2\alpha}$, $T_{p3\alpha}$, and $T_{b3\alpha}$) are reduced. The reduction of these parameters relative to Class 1 traffic helps improve the performance of existing Class 1 traffic on link α relative to other classes on link α on ring X. If load imbalance is not subsequently detected, the Class 2 and Class 3 TB parameters can be increased again.

In step 408, $T_{p1a}$ is set to $T_{u1a}$. Again, there is an interaction between the BB parameters and the QoS parameters. By signaling changes to the BB entity 230 to increase $T_{a11a}$ (step 402), more flows will be admitted on link a on ring Y, and thus $T_{u1a}$ will increase. Since $T_{p1a}$ is set to $T_{u1a}$, an increase in $T_{u1a}$ will result in an increase in $T_{p1a}$. This will allow more traffic to enter link a at node A and hence increase the bandwidth utilization of Class 1 traffic on link a.

In step 412, $B_{1\alpha}$ is increased, while $B_{2\alpha}$ and $B_{3\alpha}$ are kept fixed. This preferentially permits more Class 1 traffic to be serviced on link α on ring X at each service rotation of the scheduler 228, relative to that for Classes 2 and 3, and thus helps improve the performance of Class 1 traffic. In step 414, $B_{1a}$ is increased, while $B_{2a}$ and $B_{3a}$ are kept fixed. This preferentially permits more Class 1 traffic to be serviced on link a at each service rotation of the scheduler 228 relative to that for classes 2 and 3 and thus helps increase bandwidth utilization of Class 1 traffic on link a. The actual amount of increase may be performed in powers of two, for example, or using some other algorithm. Again, if load imbalance is not subsequently detected, the various Class 1 CBQ parameters can be changed on each of the two rings X and Y.

Changing the QoS parameters affects the performance of traffic already on the ring. Changing the BB parameters affects call admission for new traffic flows. Note that since these parameters can be changed at periodic time intervals or when there is a failure event, there is an opportunity to correct an incorrect selection of parameters at the next time interval $T_k$ using new measurement data. Therefore, the actual amount by which the QoS/BB parameters are increased or decreased affects only the time it takes to accomplish load balancing, but does not alter the objectives and results of load balancing.

Other options may also be implemented on the QoS/BB monitor. Various load imbalance detection algorithms can be selected. The selection of the measurement time interval is also left to the operator. The shorter the timer interval $T_k$, the more measurements that are available and thus, a better judgment of load imbalance can be made at the expense of computation time. This described mechanism for load balancing can easily be extended to RPRs comprising more than two rings or wavelengths.

Based upon the foregoing Detailed Description, it should be readily apparent that the present invention advantageously provides an innovative and efficient solution for correcting load imbalance in an RPR. In particular, because the QoS/BB monitor is common to all rings in an RPR, load balancing can be implemented easily, with minimal computation. The load balancing algorithm (FIG. 4) works by exercising control of traffic ingress via the BB parameters, and of traffic already on the RPR via the QoS parameters. The load balancing technique described herein allows correction of load imbalance on a class-by-class basis. Incorrect guesses for the QoS parameters and/or BB parameters can be corrected at the next time interval when new measurements are available. Finally, coordination between the QoS/BB monitors of various nodes can be implemented for other load balancing, congestion control, and fairness algorithms.

It is believed that the operation and construction of the present invention will be apparent from the foregoing Detailed Description. While the exemplary embodiments of the invention shown and described have been characterized as being preferred, it should be readily understood that various changes and modifications could be made therein without departing from the scope of the present invention as set forth in the following claims.

What is claimed is:

1. A method of implementing load balancing in a resilient packet ring ("RPR") network comprising a plurality of nodes and first and second rings each comprising a plurality of links for carrying information between the nodes in a clockwise direction and a counterclockwise direction, respectively, wherein adjacent ones of the nodes are connected by two of the links, the method comprising the steps of, for one of the nodes:

determining whether a load imbalance exists at the node in connection with a first class of service, using a technique selected from the group consisting of measuring and comparing delays experienced by a marked packet sent from the node to a second node via the first and second rings, respectively, and comparing a number of dropped packets on the first and second rings with a preselected maximum value; and responsive to a determination that a load imbalance exists:

changing Bandwidth Broker ("BB") parameters at the node for the first class of service to cause new flows to be diverted from a more heavily loaded one of the rings to a less heavily loaded one of the rings; and changing Quality of Service ("QoS") parameters at the node for the first class of service to improve traffic performance on the more heavily loaded one of the rings, while increasing bandwidth utilization on the less heavily loaded one of the rings.

2. The method of claim 1 wherein the step of determining is performed at periodic time intervals.

3. The method of claim 1 further comprising the step of signaling to a QoS/BB monitor that a load imbalance has been detected responsive to a determination that a load imbalance exists.

4. The method of claim 1 wherein the step of changing the BB parameters comprises the steps of:

decreasing an allocated bandwidth for the first class of service on the more heavily loaded ring; and increasing an allocated bandwidth for the first class of service on the less heavily loaded ring.

5. The method of claim 1 wherein the step of changing the QoS parameters comprises the steps of:

setting the peak traffic rate to the used bandwidth for the first class of service on the more heavily loaded ring;

reducing token bucket ("TB") parameters for all other classes of service on the more heavily loaded ring;

setting the peak traffic rate to the used bandwidth for the first class of service on the less heavily loaded ring; and increasing the number of bytes in a class based queue ("CBQ") for the first class of service drained off in each scheduler rotation for each of the rings.

6. The method of claim 1 wherein the RPR network is a wavelength division multiplex RPR and the first and second rings are first and second wavelengths, respectively.

7. Apparatus for implementing load balancing in a resilient packet ring ("RPR") network comprising a plurality of nodes and first and second rings each comprising a plurality of links for carrying information between the nodes in a clockwise direction and a counterclockwise direction, respectively, wherein adjacent ones of the nodes are connected by two of the links, the apparatus comprising, at one of the nodes:

means for detecting at the node a load imbalance in connection with a first class of service, including means using a technique selected from the group consisting of measuring and comparing delays experienced by a marked packet sent from the node to a second node via the first and second rings, respectively, and comparing a number of dropped packets on the first and second rings with a preselected maximum value;

means responsive to detection at the node of a load imbalance for changing Bandwidth Broker ("BB") parameters at the node for the first class of service to cause new flows to be diverted from a more heavily loaded one of the rings to a less heavily loaded one of the rings; and means responsive to detection at the node of a load imbalance for changing Quality of Service ("QoS") parameters at the node for the first class of service to improve traffic performance on the more heavily loaded one of the rings, while increasing bandwidth utilization on the less heavily loaded one of the rings.

8. The apparatus of claim 7 wherein the means for detecting performs the detecting at periodic time intervals.

9. The apparatus of claim 7 further comprising means for signaling to a QoS/BB monitor that a load imbalance has been detected.

10. The apparatus of claim 7 wherein the means for changing the BB parameters comprises:

means for decreasing an allocated bandwidth for the first class of service on the more heavily loaded ring; and means for increasing an allocated bandwidth for the first class of service on the less heavily loaded ring.

11. The apparatus of claim 7 wherein the means for changing the QoS parameters comprises:

means for setting the peak traffic rate to the used bandwidth for the first class of service on the more heavily loaded ring;

means for reducing token bucket ("TB") parameters for all other classes of service on the more heavily loaded ring;

means for setting the peak traffic rate to the used bandwidth for the first class of service on the less heavily loaded ring; and means for increasing the number of bytes in a class based queue ("CBQ") for the first class of service drained off in each scheduler rotation for each of the rings.

12. The apparatus of claim 7 wherein the RPR network is a wavelength division multiplex RPR and the first and second rings are first and second wavelengths, respectively.

13. Apparatus for implementing load balancing in a resilient packet ring ("RPR") network comprising a plurality of nodes and first and second rings each comprising a plurality of links for carrying information between the nodes in a clockwise direction and a counterclockwise direction, respectively, wherein adjacent ones of the nodes are connected by two of the links, the apparatus comprising, at one of the nodes:

a Quality of Service/Bandwidth Broker ("QoS/BB") monitor responsive to detection at the node of a load imbalance in connection with a first class of service for signaling to a BB to change BB parameters at the node for the first class of service to cause new flows to be diverted from a more heavily loaded one of the rings to a less heavily loaded one of the rings and for changing QoS parameters at the node for the first class of service to improve traffic performance on the more heavily loaded one of the rings, while increasing bandwidth utilization on the less heavily loaded one of the rings, wherein the detection of a load imbalance is accomplished using a technique selected from the group consisting of measuring and comparing delays experienced by a marked packet sent from the node to a second node via the first and second rings, respectively, and comparing a number of dropped packets on the first and second rings with a preselected maximum value.

14. The apparatus of claim 13 wherein the QoS/BB monitor is apprised of a load imbalance via an in-band signaling mechanism.

15. The apparatus of claim 13 wherein the QoS/BB monitor is apprised of a load imbalance via an out-of-band signaling mechanism.

16. The apparatus of claim 13 wherein the QoS/BB monitor changes the BB parameters by:

decreasing an allocated bandwidth for the first class of service on the more heavily loaded ring; and increasing an allocated bandwidth for the first class of service on the less heavily loaded ring.

17. The apparatus of claim 13 wherein the QoS/BB monitor changes the QoS parameters by:

setting the peak traffic rate to the used bandwidth for the first class of service on the more heavily loaded ring;

reducing token bucket ("TB") parameters for all other classes of service on the more heavily loaded ring;

setting the peak traffic rate to the used bandwidth for the first class of service on the less heavily loaded ring; and increasing the number of bytes in a class based queue ("CBQ") for the first class of service drained off in each scheduler rotation for each of the rings.

18. The apparatus of claim 13 wherein the RPR network is a wavelength division multiplex RPR and the first and second rings are first and second wavelengths, respectively.

* * * * *